United States Patent Office 3,358,051
Patented Dec. 12, 1967

3,358,051
PROCESS OF CURING A BUTADIENE POLYMER
William D. Timmons, Jr., Charlotte, N.C., and James J. Robertson, Akron, Ohio, assignors to The Firestone Tire & Rubber Company, Akron, Ohio, a corporation of Ohio
No Drawing. Filed Nov. 23, 1964, Ser. No. 413,322
1 Claim. (Cl. 260—845)

This invention relates to the vulcanization of an unsaturated butadiene polymer with a resinous hydrogen-halide reaction product of an aldehyde and a para-hydrocarbon-substituted phenol.

The resinous aldehyde reaction products of such phenols have been used as curing agents, for some time. It has now been found that the hydrogen-halide derivatives of such resins cure butadiene polymers faster than the resins which have not been so treated, and give better vulcanizates.

U.S. Patent 3,038,891 refers to the use of the hydrogen-halide reacted resin in the vulcanization of butyl rubber. Butyl rubber has a low degree of unsaturation. It is found that the highly unsaturated butadiene polymers, including homopolymers and copolymers with styrene, acrylonitrile and other vinyl-type monomers, when vulcanized with the resins of this invention have good properties and, in fact, better properties than are obtained with the resins which have not been treated with a hydrogen halide. For instance, the resistance to abrasion and cut growth is improved—of great importance in rubbers used in tires.

The resin used as a vulcanizing or curing agent in carrying out this invention results from the reaction of a para-hydrocarbon-substituted phenol with a lower aldehyde in a hydrogen-halide, the reaction product being then backwashed with water or a mild alkali. This reaction product is thought to contain, in part, a mixture of monomers, dimers and trimers based on the following formula:

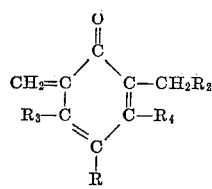

where R is an alkyl group of 1 to 12 carbon atoms (and preferably a t-alkyl group of 4 to 9 carbon atoms), $R_2$ is a hydroxyl group or a halogen atom, and $R_3$ and $R_4$ are hydrogen or lower alkyl groups.

As contrasted with butyl rubber, the butadiene rubbers are highly unsaturated and it may be speculated that the efficiency of the new curing agent is due in part to this fact, although other factors must be involved, particularly with respect to resistance to heat and oxidation imparted by the resinous curing agent. The test data show that the curing agent is effective with butadiene polymers (homopolymers and copolymers) which are at least 50 percent unsaturated. These include the butadiene homopolymers and copolymers of butadiene with monomers listed under Butadien on pages 655–656 of volume 2 of Krczil Kurzes Handbuch der polimerization-Technik (Edwards Brothers, Ann Arbor, Michigan). These monomers include styrene, methacrylic acid, methylmethacrylate, acrylonitrile, etc. The monomers may be present in an amount up to an amount equal to the amount of butadiene present. Such copolymers, as well as the homopolymers, are highly unsaturated. There are a large number of such monomers, and a number are well known in the art. The polymers may be made in emulsion or in solution; their stereo-structures do no influence the curing action critically.

Phenols representative of those used in carrying ou the reaction are those of the above formula in whicl R is an alkyl group of 1 to 12 carbon atoms, includin; t-butyl, t-amyl, t-octyl, t-nonyl and the straight-chair alkyl groups: methyl, ethyl, propyl, butyl, amyl, etc. Thesc phenols also include p-phenylphenol, p-benzylphenol p-(alpha, alpha dimethyl benzyl) phenol, p-cyclohexyl phenol and p-isobornylphenol. The phenol must have a p-hydrocarbon substituent. The aldehyde may be a lowei aliphatic aldehyde such as formaldehyde or acetaldehyde, for example.

In preparing the resin, the aldehyde-phenol reaction system is preferably saturated with hydrogen chloride after solution in hydrochloric acid, but the system may be saturated with hydrogen bromide, hydrogen iodide, or with proper precautions, with hydrogen fluoride.

The reaction product of the aldehyde and phenol in the presence of the hydrogen halide is backwashed with a weak alkali and the resulting product is heated with the butadiene polymer in a mold. The phenol is reacted with an excess of the aldehyde; about 2 moles react with 1 mole of the phenol.

In washing the reaction product of the aldehyde, phenol and acid, not only has sodium bicarbonate been found useful, but dilute solutions of sodium or potassium hydroxide, sodium carbonate or other basic materials may be used. The pH of the wash must be kept above 7. A critical pH range of 7–11 is useful, while the critical range of the preferred form of the invention is a pH of from 7 to 9. Buffer salts such as sodium hexametaphosphate, sodium polyphosphates and potassium pyrophosphate are useful in maintaining the proper pH value of the solution alone or when the more powerful alkalies are used.

The cure reaction of the compounds of the invention can be effected at temperatures as low as 220° F. up to the point where the stock would be injured by thermal decomposition. The preferred temperature range employed is at least 280° F. to about 400° F. Those skilled in the art will recognize that time and temperature are inversely correlated.

In carrying out the invention, from 2 to 20 parts of the reaction product is useful, while the preferred range is from 5 to 15 parts, all based on 100 parts by weight of the unsaturated polymer.

The curing agents of the invention give higher physical properties with increasing amounts of titratable chlorine. Likewise, the physical properties of the reaction products of the invention may be varied by varying the amount of titratable chlorine left in the reaction product. Washing with sodium bicarbonate removes titratable chlorine so that the more washing, the more titratable chlorine removed. When the reaction product is not back-washed to remove the titratable chlorine, the compounds cured with the resulting curing agent (which are outside of the present invention) have high physical properties but are extremely scorchy or prone to "precure" during factory processing, as shown by Mooney Tc and Ts values.

On the other hand, the curing agents formed in view of the present invention may have scorch values adjusted by wash-back with the hydrolyzing agent. Resins with little or no titratable chlorine have a much slower cure than stocks with about .8 percent titratable chlorine, the latter have practically no scorch tendencies as shown by Tc and Ts values. Increasing amounts of titratable chlorine give increased physical properties and corresponding increases in scorchiness as shown by Tc and Ts values.

An additional means of controlling the scorch in stocks with the chlorinated curing resins has been found to be the use of a blend of magnesium oxide and zinc oxide to replace the use of zinc oxide alone, as disclosed in said U.S.

3,038,891. As can be seen from the examples in Table II scorch resistance of stocks wherein this oxide combination is used were generally superior to that of similar stocks containing the standard chlorine-free curing resin. Usually, replacement of from 25 to 50 percent of the zinc oxide with magnesium oxide will give the desired result.

While different uses of the vulcanizates of the invention will determine what level of scorch resistance and physical properties are desired or permitted by processing conditions, a critical range of from .2 percent to 6 percent titratable chlorine is useful. For rubber compounds extruded and shaped into tire curing elements, a critical range of from .8 to 4 percent is most useful, while a critical range of from 1 to 2 percent is preferred.

*Resin preparation*

This example is illustrative:

To a clean, closed 50-gallon reactor there are added 133.4 pounds of formalin and 106.8 pounds of hydrochloric acid. The reactor is cooled to 20° C. The solution is stirred and maintained at about 20° C. while 68 pounds of hydrogen chloride are passed into the solution. Excess pressure is bled off. The reactor is opened and 60 pounds of p-t-amylphenol is added as rapidly as possible. The reactor is then closed and stirring is resumed for about 90 minutes while the temperature is held at 50° C. The reaction is then cooled to 20–25° C., the aqueous phase is drained off, and 10 pounds of n-hexane is added with stirring. After several washings with water, NaHCO₃ is added, with stirring, until no more than 2 percent titratable chlorine is present. Titratable chlorine is the percent chlorine by weight determined by titrating the solution with 0.25 to 5 N sodium hydroxide in a conventional manner. The hexane is removed by vacuum distillation and the end product obtained is a resinous mixture including monomers, dimers and trimers of the following, as shown by infrared analysis:

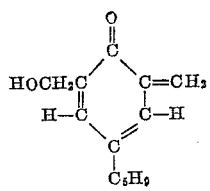

and

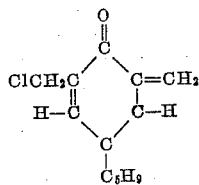

Upon analysis this mixture had 8.81 percent total chlorine and 8.08 percent methylol content.

Various butadiene homopolymers and copolymers were cured with this chlorine-containing resin, and were found to have exceptional properties.

Table I is illustrative of the improved normal stress-strain properties of the product obtained with the chlorinated curing resin as compared with the product obtained with a chlorine-free resin in a compounded stock based on linear solution-polymerized polybutadiene.

In Table II similar comparisons are made in stocks based on copolymers of butadiene with methacrylic acid, acrylonitrile and methylmethacrylate. Very desirable increases in normal, aged and hot tensile strength are evident where chlorine-containing curing resin is used.

A comparison of a typical SBR tread stock cured in the normal manner with sulfur and a similar stock cured with chlorine-containing resin is contained in the examples of Table III. Obvious advantages in normal, aged and hot tensile strength are shown. Of even greater importance for tire-tread use is the significant reduction in aged cut growth. Furthermore, the stock designated Sample 10 (Table III) was run on a tow bar wear test (as described by L. P. Gelinas and E. B. Story, Rubber Chem. and Tech., 35 339, 1962) against a sulfur cured SBR control compounded with 55 phr. of ISAF and 35 phr. of highly aromatic petroleum oil. The wear index of the stock cured with chlorine-containing resin was 162 versus 100 for the control.

TABLE I

|  | Sample 1 | Sample 2 |
|---|---|---|
| Linear Polybutadiene | 100 | 100 |
| HAF Black | 40 | 40 |
| Stearic Acid | 1 | 1 |
| Staybelite Resin [1] | 5 | 5 |
| Zinc Oxide | 5 | 3.5 |
| Magnesium Oxide | 0 | 2.5 |
| Neoprene W | 10 | 0 |
| Chlorine-free resin | 10 | 0 |
| Chlorine-containing resin | 0 | 10 |
| Normal Physical Properties, cured 30 Minutes at 300° F.: |  |  |
| 300% Modulus, p.s.i. | 1,100 | 850 |
| Tensile Strength, p.s.i. | 1,775 | 2,350 |
| Ultimate Elongation, percent | 400 | 560 |

[1] A hydrogenated rosin, product of Hercules Chemical Co.

TABLE II

|  | Sample |  |  |  |  |  |
|---|---|---|---|---|---|---|
|  | 3 | 4 | 5 | 6 | 7 | 8 |
| BD/MAA [1] | 100 | 100 | 0 | 0 | 0 | 0 |
| Butaprene NXM [2] | 0 | 0 | 100 | 100 | 0 | 0 |
| BD/MMA [3] | 0 | 0 | 0 | 0 | 100 | 100 |
| HAF Black | 40 | 40 | 40 | 40 | 40 | 40 |
| Stearic Acid | 1 | 1 | 1 | 1 | 1 | 1 |
| Staybelite Resin | 5 | 5 | 5 | 5 | 5 | 5 |
| Zinc Oxide | 5 | 3.5 | 5 | 3.5 | 5 | 3.5 |
| Magnesium Oxide | 0 | 1.5 | 0 | 1.5 | 0 | 1.5 |
| Neoprene W | 3 | 0 | 3 | 0 | 3 | 0 |
| Chlorine-free resin | 10 | 0 | 10 | 0 | 10 | 0 |
| Chlorine-containing resin | 0 | 10 | 0 | 10 | 0 | 10 |
| Mooney Scorch at 265° F.: |  |  |  |  |  |  |
| Ts | 2.5 | 3.5 | 18 | 11 | 17 | 20 |
| Tc | 4 | 7 | 40 | 17 | 35 | 37 |
| Vm | 36.5 | 80 | 31 | 34.5 | 25 | 21.5 |
| Normal Physical Properties—Cured at 320° F.: |  |  |  |  |  |  |
| 300% Modulus, p.s.i.: |  |  |  |  |  |  |
| 23 min | | | 1,000 | 1,700 | 1,400 | 1,050 |
| 30 min | | | 1,275 | 1,975 | 1,775 | 1,250 |
| 45 min | | | 1,525 | 2,100 | 2,050 | 1,475 |
| 60 min | | | 1,675 | 2,075 | 2,075 | 1,600 |
| Tensile Strength, p.s.i.: |  |  |  |  |  |  |
| 23 min | 3,000 | 4,050 | 1,825 | 3,250 | 2,475 | 3,200 |
| 30 min | 3,875 | 4,100 | 2,000 | 3,175 | 2,800 | 3,600 |
| 45 min | 3,900 | 4,150 | 2,175 | 3,225 | 2,500 | 3,500 |
| 60 min | 3,625 | 3,900 | 2,400 | 3,475 | 2,850 | 3,500 |
| Tensile Strength After Aging 4 Days at 212° F.: |  |  |  |  |  |  |
| 23 min | 3,075 | 3,925 | 2,400 | 3,500 | 2,325 | 3,050 |
| 30 min | 2,650 | 4,100 | 2,375 | 3,475 | 1,875 | 3,125 |
| 45 min | 3,000 | 3,800 | 2,625 | 3,525 | 2,500 | 3,125 |
| 60 min | 2,800 | 3,850 | 2,375 | 3,600 | 2,000 | 3,225 |
| Tensile Strength at 400° F.: 45 min | | | 330 | 520 | 400 | 450 |

[1] Butadiene-methacrylic acid copolymer (85/15) suitable for use in tires, mechanical goods, etc.
[2] Butadiene-acrylonitrile (60/40) copolymer. A nitrile rubber used extensively in mechanical goods.
[3] Butadiene-methylmethacrylate (70/30) copolymer used in tires, etc

TABLE III

| | Sample 9 | Sample 10 |
|---|---|---|
| SBR 1500 | 100 | 100 |
| HAF Black | 50 | 50 |
| Stearic Acid | 2 | 1 |
| Staybelite Resin | 0 | 5 |
| Aromatic Oil | 4 | 0 |
| Paraffin Wax | 3 | 4 |
| Antioxidant | 2.3 | 0 |
| Zinc Oxide | 3 | 3.5 |
| Magnesium Oxide | 0 | 1.5 |
| Chlorine-containing resin | 0 | 14 |
| Sulfur | 2 | 0 |
| Accelerator | 1.2 | 0 |
| Normal Physical Properties—Cured 30 Minutes at 320° F.: | | |
| 300% Modulus, p.s.i. | 2,500 | 2,150 |
| Tensile Strength, p.s.i. | 3,775 | 3,850 |
| Ultimate Elongation, percent | 420 | 490 |
| Tensile Strength, p.s.i.: | | |
| At 212° F | 1,520 | 1,830 |
| At 275° F | 1,080 | 1,230 |
| After Aging 4 Days at 212° F.: | | |
| Tensile Strength, p.s.i. | 2,700 | 3,650 |
| Ultimate Elongation, percent | 190 | 380 |
| Cut Growth After Aging 5 Hours in Air Bomb at 260° F.: 0.01 inch/hour | 368 | 18 |

Although the invention relates to the use of the resin with a specified chlorine content in the vulcanization of unsaturated polymers, the presence of magnesium oxide with zinc oxide has been found to reduce the tendency of cures to scorch whether the polymer be an unsaturated polymer as claimed, or butyl rubber, and whether the resin used is the chlorine-containing resin disclosed herein and in U.S. 3,038,891 or the phenol-aldehyde reaction product which has not been treated with hydrogen chloride.

What we claim is:

The method of vulcanizing a polymer of the class consisting of homopolymers of butadiene and copolymers thereof which contain up to, but no more than, an equal amount of a comonomer, which comprises heating the polymer to vulcanizing temperature with 2 to 20 parts by weight per 100 parts by weight of the polymer of a material of 0.2 to 6 percent titratable chlorine content resulting from treating with weak alkali the reaction product of one mole of p-t-amyl phenol with at least two moles of formaldehyde in the presence of hydrogen chloride, using zinc oxide and magnesium oxide as curing agents, the magnesium oxide being present in an amount equal to 25 to 50 percent of the total of said oxides present.

References Cited

UNITED STATES PATENTS

| | | | |
|---|---|---|---|
| 2,767,156 | 10/1956 | Tawney et al. | 260—846 |
| 2,898,321 | 8/1959 | Shepard | 260—846 |
| 3,038,891 | 6/1962 | Timmons et al. | 260—85.3 |
| 3,039,978 | 6/1962 | Fusco et al. | 260—846 |

OTHER REFERENCES

"Introduction to Rubber Technology," Morton, Reinhold, 1959, TS 1890 M66 C. 3, pp. 340 and 341.

GEORGE F. LESMES, *Primary Examiner.*

MURRAY TILLMAN, *Examiner.*

J. C. BLEUTGE, *Assistant Examiner.*

UNITED STATES PATENT OFFICE
CERTIFICATE OF CORRECTION

Patent No. 3,358,051                      December 12, 1967

William D. Timmons, Jr., et al.

It is certified that error appears in the above identified patent and that said Letters Patent are hereby corrected as shown below:

Column 4, line 13, after "of ISAF" insert -- Black --.

Signed and sealed this 24th day of June 1969.

(SEAL)
Attest:

Edward M. Fletcher, Jr.                      WILLIAM E. SCHUYLER, JR.
Attesting Officer                                Commissioner of Patents